Sept. 18, 1951  G. V. ELTGROTH  2,568,277
FLUID TESTING APPARATUS
Original Filed Aug. 1, 1942

INVENTOR
GEORGE V. ELTGROTH
BY David F. Doody
ATTORNEY

Patented Sept. 18, 1951

2,568,277

UNITED STATES PATENT OFFICE 2,568,277

FLUID TESTING APPARATUS

George V. Eltgroth, Towson, Md., assignor to Bendix Aviation Corporation, New York, N. Y., a corporation of Delaware Original application August 1, 1942, Serial No. 453,255. Divided and this application September 5, 1945, Serial No. 614,499

1 Claim. (Cl. 73—24)

This invention relates to the determination of fluid composition, either liquid or gaseous, and more particularly to testing apparatus utilizing a column of fluid under test to determine the frequency in an oscillating circuit. This invention is a division of my copending application Serial No. 453,255, filed August 1, 1942, now abandoned and entitled "Fluid Testing Method and Apparatus."

It has been known for some time that the velocity of sound propagation and gaseous mixtures is dependent upon the density of the mixture almost exclusively, as all gases have nearly identical bulk moduli. Knowing the density of a mixture of two known gases having differing molecular weights, the relative proportion of the two gases is readily determined. A system of this nature has been illustrated in the prior art in which electro-acoustic transducers are situated at either end of a column of the fluid mixture to be measured, with one transducer connected to the input of an amplifier circuit and the other transducer connected to the output thereof, and an amplifier connected between the transducers, so that the acoustic transmission path through the medium being investigated forms a link for transferring output circuit energy back into the input circuit of the amplifier to produce sustained oscillations with a frequency determined by the time delay existing in the acoustic transmission path. The output frequency of this combination, controlled as it is by the density of the gas in the acoustic feedback column, is an index of the composition of that gas when the mixture consists of varying proportions of two known substances.

In addition to being controlled by the molecular weight of the gases in the acoustic feedback path, the frequency is also subject to variations arising from changes in the ambient temperature of the testing apparatus, since this also influences the fluid density. In the case of gases, this variation amounts to approximately 1% change in frequency for a temperature change of 5.5° C., at 0° C. The frequency increases with rising temperature. If working with a nearly constant mixture of gases, it is possible to effectively compensate such temperature induced errors by temperature compensation of the frequency indicating apparatus, but where the composition of the gases under test varies widely, such compensation is unsatisfactory because of a constant, absolute magnitude, although it should be constant expressed in terms of percentage. I have found that substantially perfect compensation on the constant percentage basis may be effected by varying the dimensions of the test chamber so that the time delay introduced by acoustic propagation therethrough is, at any temperature, substantially equal to the time delay at the temperature of original calibration.

One of the principal objects of this invention is to provide new and novel apparatus and method for the testing of fluid mixtures having improved accuracy and greater range of test indication.

A further object of the invention is to provide new and novel apparatus for continuously indicating the composition of a fluid under test.

Another object of the invention is to provide new and novel method and apparatus for determining the composition of fluid mixtures with an accuracy substantially unaffected by temperature variations.

Still another object of the invention is to provide new and novel method and apparatus for determining the specific gravity of liquid solutions.

The above objects and advantages of the invention are accomplished in the main by incorporating an acoustic feed back path through the fluid to be tested in an oscillating circuit as a frequency determining element, and providing means to vary the length of said acoustic feedback path in accordance with temperature to provide a normalized propagation delay therethrough.

Other objects and advantages will in part be disclosed and in part be obvious when the following specification is read in conjunction with the drawings in which.

It is to be understood that these drawings are intended to illustrate selected forms of the invention, and are not to comprise a limitation in the content or scope of the invention.

Figure 1:
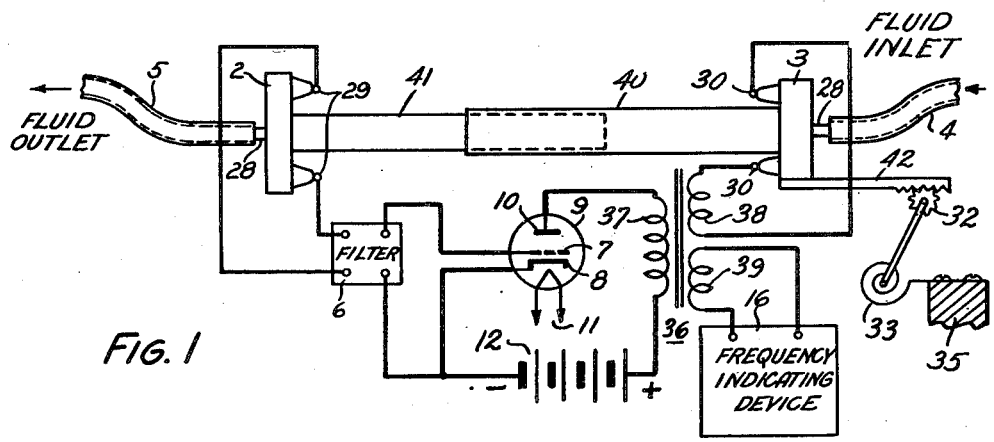
Figure 1 is a diagrammatic showing of the invention applied to a telescoping test chamber with an electro-acoustic transducer at either end.

Referring now to Fig. 1, there is seen a test chamber defined by the telescoping tubes 40 and 41, the open end of the larger cylinder 40 being slipped over the open end of the smaller cylinder 41 and in intimate engagement therewith to prevent excessive leakage. The ends of the telescoping tubes, which are not in engagement, are fitted respectively with transducer 2 at the one end of the inner telescoping tube 41, and transducer 3 at the free end of the outer telescoping tube 40. In the illustrated configuration, the transducer 2 converts acoustic energy to electrical energy, while transducer 3 converts electrical energy into acoustic energy. Each of the transducers is provided with a hose fitting 28 and the fluid under test is conveyed to the test chamber defined by the tubes 40 and 41 through the inlet hose 4 attached to the hose fitting 28 of transducer 3 and is removed from the test chamber through the outlet hose 5 attached to the hose fitting 28 of transducer 2. The output terminals 29 of the transducer 2 are connected to the input circuit of the amplifier triode 9 through the filter 6, which may be of the high pass, low pass or band pass type, depending upon the characteristics of the transducers employed. The input terminals of filter 6 are connected across the output terminals 29 of transducer 2 and the output terminals of the filter are connected to the control grid 7 and the cathode 8 of the amplifier 9. The cathode 8 is maintained at a suitable temperature for the emission of the electrons essential to the operation of the triode amplifier 9 by current passing through the heater 11. The power supply circuits for this heater are omitted for the sake of clarity of presentation as such circuits are well known in the art. The anode 10 of amplifier 9 is connected in series with the primary coil 37 of the coupling transformer 36 to the positive terminal of the direct-current power source 12 and the anode circuit is completed by the connection of the negative terminal of source 12 to the cathode 8. Energy is transferred from the anode circuit to the frequency indicating device 16 through the coupling transformer 36 having the secondary winding 39 connected to the frequency indicator 16. An additional secondary winding 38 has its terminals connected with terminals 30 of the transducer 3 and serves to transfer the periodic energy in the anode circuit of the vacuum tube 9 to the operating elements of the transducer 3.

The tubes 40, 41 are slidable one over the other, and their positioning with reference to one another is automatically adjusted to maintain constant frequency despite changes in the temperature of a given gas within the testing chamber by the thermostat 33 attached to the support 35 and driving the gear 32 through the connecting shaft 34. The rotation of the gear 32 displaces the rack 42 and the attached tube 40 linearly as the ambient temperature changes, by an amount sufficient to compensate for the variation in the velocity of sound propagation within the tested fluid with change in temperature. When the fluid under test is a gas, it has been found desirable to lengthen the test chamber by approximately .002 inch per inch of test chamber length per degree centigrade increase in temperature.

Figure 2:
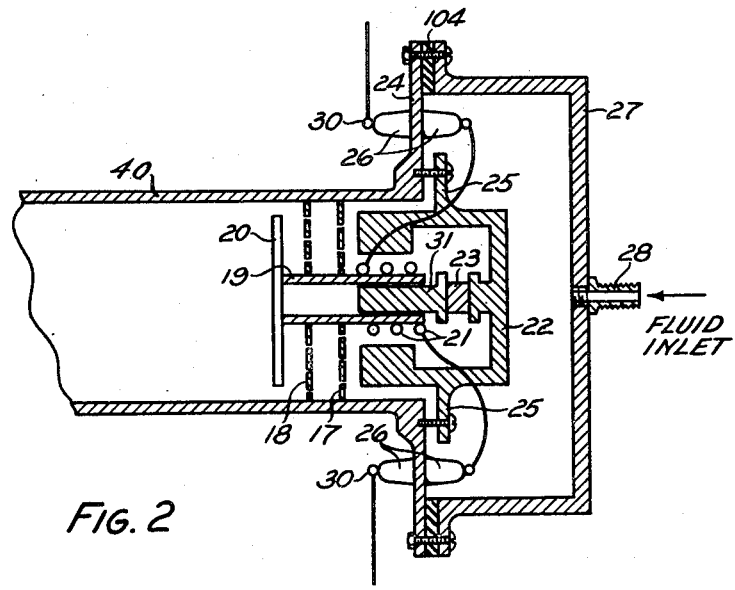
Figure 2 is a detail view of a transducer suitable for use in the practice of the invention.

Details of the construction of a suitable electrodynamic transducer unit 3 are shown in Figure 2, where the tube 40 is seen provided with the flexible perforated spiders 17 and 18 carrying the coil form 19 to which is attached the diaphragm 20. The driving coil 21 is wound on the rear of form 19 and is situated in the radial magnetic field produced within the annular gap between the pole piece 31 and the open end of the magnetic pot 22. The passage of current through the winding 21 results in the displacement of the diaphragm because of the reaction between the magnetic field and the winding current to an extent determined by the flexibility of the spiders 17 and 18. The magnetomotive force required for the maintenance of the radial flux is provided by the magnetic slug 23 inserted in the magnetic circuit, the slug 23 preferably being a highly magnetized piece of some highly retentive magnetic material, as for example, that alloy of aluminum nickel and cobalt known to the trade as Alnico. The flanged fitting 24 may be sweated to the end of the tube 40 as shown, providing a mounting for the pot 22 which is secured by the screws passing through the mounting bosses 25, of which there may be three or four, into the fitting 24. The bosses 25 are preferably spaced peripherally to permit free passage of the fluid to be tested past them, through the perforate spiders 17 and 18 and past the edge of the diaphragm 20 into the testing chamber proper. Leads from the ends of the driving coil 21 are brought out through the feed-through insulators 26 mounted on the fitting 24 to the terminals 30, where connection may be made to the desired external circuits. The entire transducer assembly is surrounded by the fluid tight cover 27 secured to the flanged fitting 24 by screws in the manner shown, and this joint is rendered fluid tight by the gasket 104 between fitting 24 and the cover 27 at the point of contact. The cover 27 is provided with the hose fitting 28 through which the fluid to be tested is passed. In operation, an alternating current is passed through the driving coil 21, driving it and the attached diaphragm 20 back and forth at a rate determined by the frequency of the impressed current and generating pressure waves of this frequency which pass through the test chamber defined by the tubes 40 and 41 and react upon the diaphragms of the two transducers.

Transducer 2 may be of the same construction as transducer 3. When used to convert acoustic energy to electrical energy, the incidence of sound pressure waves on the diaphragm 20 displaces the coil 21 in the magnetic field generating a voltage therein whose wave form and frequency are dependent on those characteristics of the incident pressure wave, and this voltage may be taken off at the connections to the coil. In common with all mechanical systems having mass and compliance, the driving coil and diaphragm system are resonant at a frequency dependent on the mass of the assembly and the stiffness of the flexible spiders 17 and 18 and in most practical designs of the type shown this frequency will be less than 300 or 400 cycles per second. However, suitable transducers may be designed having any desired resonance frequency. The resonance frequency of the transducer is an important factor in the design of equipment of this type, for it is at this frequency that the energy is changed from acoustic to electrical form or vice-versa with the maximum efficiency.

The operation of the apparatus of Figure 1 as an oscillation generator may now be comprehended readily. The arrangement there shown is a feedback oscillator with the fluid column within the chamber defined by the tubes 40 and 41 included in the feedback circuit. Assuming a random variation in the anode current of the amplifier 9, the transducer 3 whose diaphragm is displaced as a result of the current variation, generates a sound pressure wave which travels through the fluid within the chamber and strikes the diaphragm of the transducer 2 which is thereby displaced generating a voltage within the coil driven by the diaphragm. The voltage from transducer 2 then passes through the filter 6 to the control grid 7 of the amplifier 9 where it arrives with such polarity that the initial random variation in anode current is increased, this process continuing until the electrode voltages of the amplifier 9 are such that one of the flat ends of the operating characteristic is reached. At this point all the voltages begin to reverse in polarity and continue in this direction until the opposite end of the operating characteristic is encountered when they once more reverse. These reversals, or alternations as they are termed, occur at a rate determined by the transducer characteristics, the filter 6 and, under proper conditions, the velocity of sound within the fluid in the test chamber. It is well known that a vacuum tube oscillator circuit oscillates at a frequency fixed by two factors; the transmission gain around the fedback circuit and the phase relation between grid and anode voltages. The frequency of oscillation is thus that which provides grid and anode voltages 180 degrees out of phase and realizes more loop circuit gain than any of the other many frequencies at which the necessary phase relations are satisfied. Now, in the absence of the filter 6, the maximum loop circuit gain in the circuit of Figure 1 occurs very close to the resonance frequencies of one or both of the transducers 2, 3 because of the high transducing efficiency realized in this region and because the phase relation between the sound pressure wave and the input current to or the output voltage from the coil 21 changes so rapidly in the region of transducer resonance, the entire gamut of possible phase relations between grid voltage and anode voltage is covered in the frequency range immediately adjacent these resonance frequencies. Therefore, in the absence of filter 6, the oscillation frequency is determined by the transducer resonance frequency and is substantially independent of the composition of the fluid within the test chamber, and the oscillation frequency does not afford a method of determining the composition of the fluid mixture in the test chamber. To secure oscillation frequencies which vary with the density of the fluid within the test chamber, I have found it necessary to include the filter 6 in the input or output circuit, alternatively, of the amplifier to reduce the transmission gain around the loop including the amplifier tube 9, the transducers 2 and 3, and the fluid column in the test chamber in the region of the transducer resonant frequency. In a particular embodiment of the invention in which transducers having a resonance frequency of 130 cycles per second separated by an interval of six inches were employed and the test chamber was filled with air, it was found that when a 400-cycle high pass filter was inserted at 6, an oscillation frequency of 1100 cycles per second was obtained for one polarity of connection between the terminals 29 of transducer 2 and the input of the filter, and with the lead connections reversed the oscillation frequency changed to approximately 2200 cycles per second. The lower frequency was such that the length of the fluid column approximately equaled one-half wavelength while the higher frequency corresponded approximately to a fluid column length of one wavelength. When oscillating in the 1100-cycle mode, the necessary 180-degree relationship between the grid and anode voltages of the amplifier was produced by the 180 degrees of phase shift introduced in the fluid column one-half wavelength long, while the same effect was produced by the reversal of the transducer connections when the 2200-cycle mode of oscillation was predominant. With the connections such that oscillations occurred in the 1100 cycle-mode at normal air pressures it was found that decrease in the pressure within the test chamber caused a new mode of oscillation to become predominant with a resultant abrupt change in oscillation frequency. The pressure at which the frequency changes is believed to be that pressure at which energy transfer between the two transducers occurs with equal efficiency through the walls of the test chamber and through the column of fluid under test. Elimination of the second mode as a possibility may be achieved by the use of a band pass filter passing only frequencies in the immediate neighborhood of 1100 cycles per second in the position of 6 in Figure 1. This method was employed in the construction of model apparatus and it was found that a simple parallel resonant circuit having a Q of about 10 and tuned to 1100 cycles per second served admirably. With this filter installed, the oscillation frequency was substantially independent of the pressure in the test chamber. In one series of tests, an oscillation frequency of 1066 cycles per second was obtained with air in the test chamber. A mixture of 10% carbon dioxide and 90% air was now passed through the test chamber utilizing the inlet and outlet tubes and the oscillation frequency dropped to 1038.5 cycles per second, a change of 2.58%, agreeing closely with the calculated value of 2.5% resulting from computation of the velocity of sound in the new mixture. As an example of the sensitivity of the apparatus to gases lighter than air, it is computed that the presence of 2% hydrogen will shift the oscillation frequency 1%. The oscillation frequency is determined by means of the frequency indicating device 16 which may, for example, by a frequency meter of the moving vane type of the electronic type charging and discharging a condenser, and reading the current passing through the condenser.

Temperature error is eliminated, as the length of the test chamber is regulated to secure constant time of travel from one transducer to the other when testing any given gas. The transformer 36 in the amplifier anode circuit serves both as an impedance matching device to match the impedance of the driving coil of the transducer to the anode circuit of the amplifier and as a means for impressing the oscillation voltage on the frequency indicating device 16.

It is not absolutely necessary that two transducers situated at opposite ends of the test chamber be employed in an oscillating circuit to produce oscillations whose frequency is controlled by the velocity of sound of the medium in the test chamber. It is known that when a loudspeaker is so disposed that the acoustic energy is radiated into an enclosure absorbing little of the radiated acoustic energy, the measurement of the electrical input impedance to the speaker driving element varies with frequency in the manner of a circuit having a number of resonant frequencies and a number of degrees of freedom. Thus, traveling along the frequency spectrum, the impedance is first highly reactive inductively, then highly resistive and then at a slightly higher frequency, reactive capacitively. This phenomenon recurs at many different points as the frequency is increased. In speakers or transducers having relatively low resonance frequencies, the first of these impedance humps usually occurs at the transducer resonant frequency. The next is due to first order or fundamental resonance of the cavity or chamber which is determined by the velocity of sound in the medium filling the chamber. Other humps in the impedance curve occur as the frequency passes through successive modes of cavity resonance. It is therefore possible to employ a single electroacoustic transducer coupled to a closed resonating chamber and connected with a network presenting a negative resistance. In such case, oscillations will be produced within the test chamber, having a frequency equal to one of its resonant frequencies and controlled by the density of the fluid in the test chamber.

The velocity of sound propagation in fluids is proportional to the square root of ratio of the bulk modulus to the fluid density. An increase in fluid density, therefore, is accompanied by a decrease in the velocity of propagation and in the device described results in a decrease in the oscillation frequency. In the case of gases in a chamber of constant dimensions, it has been found that the generated oscillation frequency varies approximately as the inverse of the square root of the molecular weight of the gas.

The system of the invention is of value not only in the testing of flue gases and exhaust gases of internal combustion engines, but is also convenient for the continuous monitoring or recording of the specific gravity of liquids such as boiler water and petroleum distillates. Suitable recording type frequency meters for use with equipment of this nature are already well known in the art.

It will be obvious that many changes and modifications may be made in the invention without departing from the spirit thereof as expressed in the foregoing description and in the appended claim.

What is claimed is:

In fluid testing apparatus, a test chamber adapted to receive the fluid under test, means for controlling a dimension of said test chamber in response to temperature variations, means for generating oscillations in said fluid within said test chamber at a frequency controlled by the velocity of sound propagation in said fluid and by said controlled dimension, and means actuated by the frequency of said oscillations for indicating a characteristic of said fluid.

GEORGE V. ELTGROTH.

REFERENCES CITED

The following references are of record in the file of this patent:

UNITED STATES PATENTS

| Number | Name | Date |
| --- | --- | --- |
| 1,269,599 | Haber et al. | June 18, 1918 |
| 1,570,781 | Ruben | Jan. 26, 1926 |
| 1,735,864 | Hutchinson | Nov. 19, 1929 |
| 2,283,750 | Mikelson | May 19, 1942 |
| 2,458,164 | Hill et al. | Jan. 4, 1949 |